Sept. 13, 1932.  G. A. JOHNSON ET AL  1,877,330
HAND BRAKE
Filed Aug. 7, 1930
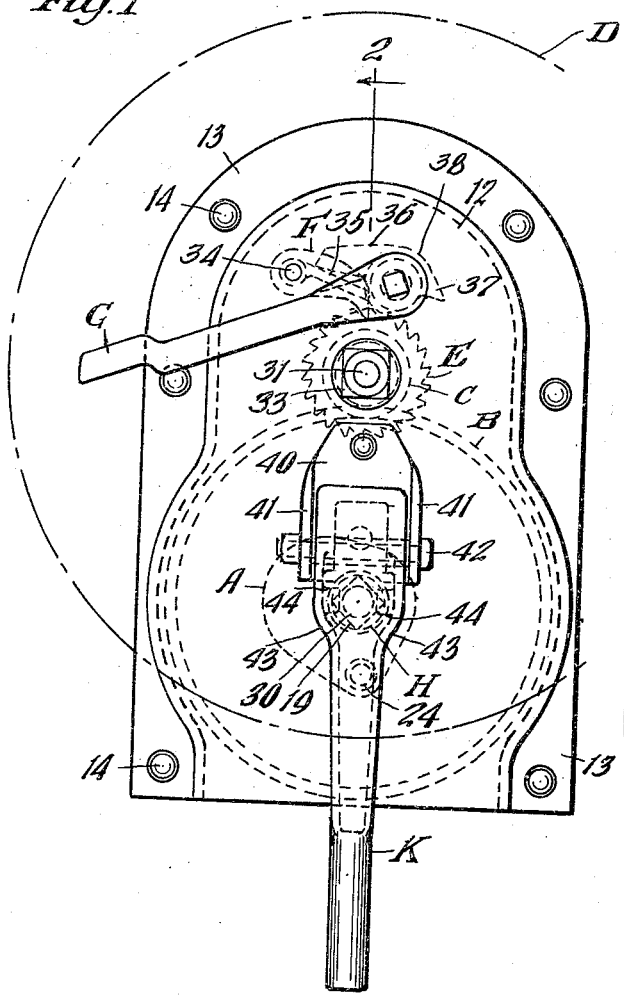

Patented Sept. 13, 1932

1,877,330

UNITED STATES PATENT OFFICE

GEORGE A. JOHNSON AND STACY B. HASELTINE, OF CHICAGO, ILLINOIS, ASSIGNORS TO W. H. MINER, INC., OF CHICAGO, ILLINOIS, A CORPORATION OF DELAWARE

HAND BRAKE

Application filed August 7, 1930. Serial No. 473,560.

This invention relates to improvements in hand brakes.

One object of the invention is to provide a hand brake mechanism of the power multiplying gear operated type especially adapted for railway cars, wherein clutch means is provided between the chain winding drum and operating hand wheel, which clutch means when disengaged effects quick release of the brakes with free running of the drum with respect to the operating hand wheel, thereby protecting the brakeman against injury.

A further object of the invention is to provide in a hand brake mechanism of the character specified in the preceding paragraph, ratchet means for preventing rotation of the operating hand wheel in unwinding direction during tightening of the brakes and positively holding the hand wheel against rotation while the chain is being unwound from the drum during release of the brakes.

Another object of the invention is to provide in a hand brake mechanism including a chain winding drum and a rotary manually actuated operating means simple and efficient manually controlled clutch means for connecting and disconnecting the operating means and drum.

Other objects of the invention will more clearly appear from the description and claims hereinafter following.

In the drawing, forming a part of this specification, Figure 1 is a front elevational view of our improved hand brake mechanism, illustrating the same applied to the vertical end wall of a railway car, certain parts of the hand brake mechanism within the housing being illustrated in dotted lines. Figure 2 is a vertical, transverse sectional view, corresponding substantially to the line 2—2 of Figure 1. Figure 3 is a view similar to Figure 2, partly broken away, and illustrating the mechanism shown at the bottom of Figure 2, and showing another embodiment of the invention. Figure 4 is a detailed, perspective view of a cam lever employed in connection with the embodiment of the invention illustrated in Figure 3.

Referring first to the embodiment of the invention illustrated in Figures 1 and 2, our improved hand brake mechanism is preferably mounted within a housing secured to the vertical end wall of the car 10, the housing being composed of two sections 11 and 12. The section 11, which forms the rear wall of the housing, is in the form of a substantially flat plate of the configuration illustrated in Figure 1. The section 12 of the housing forms a cover member and contains the operative parts of the brake mechanism. The section 12 is of the outline shown in Figure 1 and has side and top flange members 13—13 laterally projecting therefrom by which the same is secured to the plate section 11 by means of rivets 14—14 extending therethrough and through said plate. As most clearly shown in Figure 2, the rivets 14 are also employed to secure the housing to the end wall 10 of the car.

The improved hand brake mechanism, as illustrated in Figures 1 and 2, comprises broadly a chain winding drum A; power multiplying gears B and C; a hand wheel D; a ratchet E; a locking dog F; a locking dog operating means G; a sliding clutch member H; and a clutch operating lever K.

The chain winding drum A is rotatably supported within the housing and has the hub section thereof formed with journal portions 15—15 at the front and rear sides thereof. The journal portion 15 at the front side is rotatably supported within a reinforced opening 16 provided in the front wall of the housing. The chain winding drum A is further supported by means of the sliding clutch member H, which is reciprocably mounted within the same. As most clearly shown in Figure 1, the drum A has an axial opening 17 therethrough which is of substantially cylindrical cross section for the greater part of its extent, the innermost portion 117 thereof being of square cross-section. This opening receives the member H. The member H has a portion 18 of substantially cylindrical cross section, the same being of such a diameter as to fit within the square opening of the drum. Immediately adjacent the cylindrical portion 18, and to the right thereof, as viewed in Figure 2, the clutch member H is of square cross section, as indicated at 19, said portion 19 slidably fitting the square opening of the hub of the drum. Inwardly of the section 19 the member H is formed with a cylindrical bearing portion 20 of smaller size than the cylindrical portion 18 and rotatably supported in an inwardly projecting hollow bearing boss 21 provided on the rear wall 11 of the housing. As will be clear, the chain winding drum A is thus supported for rotation at the outer end directly by the bearing member of the outer wall of the housing and is further supported on the clutch member H which in turn is rotatably supported at the inner end by the bearing member provided on the rear wall of the housing. The chain winding drum section proper of the member A is preferably of cam shape outline, as most clearly shown in Figure 1, and is provided with a chain receiving guide groove 22 which accommodates certain portions of the links of the brake chain 23, which is secured at one end to the drum and has the other end thereof connected with the brake mechanism of the car, not shown. The chain winding drum is movable through the bottom of the housing, which is open, as clearly shown in Figure 2. The innermost link of the chain 23 is fixed to the drum by means of a securing pin 24 extending through the opposed side walls of the groove 22 of the drum.

The power multiplying gear B is provided with a hub portion 25 having an axial opening therethrough, the opening at opposite ends of the hub being of substantially cylindrical formation, said cylindrical portions of the opening of the hub being designated by 26 and 27, respectively. Between the cylindrical portions 26 and 27, the opening of the hub is reduced in size and is of square cross section, as indicated at 28, the size of said square portion being such as to interfit with the square portion 19 of the sliding clutch member H. The cylindrical portion 26 of the opening fits the cylindrical bearing portion of the hub of the drum A and the gear B is thus rotatably supported on said cylindrical hub portion. The opening 27 at the rear side of the hub of the gear B rotatably fits the outer surface of the bearing boss 21 on the rear wall of the housing. As will be evident, the gear B is thus rotatably supported on said boss. In the normal position of the parts, which is that shown in Figure 2, the sliding clutch member H is so disposed that the square portion thereof is in shouldered engagement with the square openings of both the chain winding drum A and the gear B. The sliding clutch member H is provided with a projecting section 29, which extends outwardly of the housing and is provided with an annular groove 30, which cooperates with means on the clutch operating lever K to connect these parts.

The power multiplying gear C, which is of smaller diameter than the gear B, is preferably formed integral with a shaft 31, which is rotatably supported in the housing. The shaft 31 also has the ratchet member E preferably formed integral therewith. As most clearly shown in Figure 2, the shaft is journaled in bearing openings 32—32 provided in the front and rear walls of the housing and projects outwardly of the outer wall of the housing. The projecting end of the shaft 31 is of square cross section and of tapered form so as to interlock with the hub portion of the hand wheel D through which the same extends. The hand wheel D is fixed to the shaft by means of a locking nut 33 at the outer end of said shaft.

The locking dog F, which cooperates with the ratchet member E, is pivotally supported within the housing by means of a transversely extending pivot pin 34 and is located above said ratchet. At the free end, the dog is provided with a tooth which cooperates with the tooth of the ratchet member E in the usual manner. At the forward side, the dog has a projecting plate-like web portion 35, which is engaged by oppositely projecting arms 36 and 37 on a member 38 fixed to the operating lever G for manipulating the locking dog. As will be evident, when the operating lever G is in the position shown in Figure 1, the arm 36 of the member 38 rests on the web 35 of the dog, thereby holding the dog in ratcheting position through the action of gravity and preventing rotation of the hand wheel in chain unwinding direction. In order to release the dog from locking engagement with the ratchet member E, the lever is swung or rotated in a clockwise direction, as viewed in Figure 1, whereby the projection 37 of the member 38 is engaged beneath the web 35 of the dog and lifts the same out of engagement with the ratchet member E. As will be clear, the weighted lever G will maintain the dog in such a disengaged position until it has again returned to the operative position illustrated in Figure 1.

The clutch operating lever K is pivoted at its inner end to a supporting bracket 40 secured to the outer face of the front wall of the housing. The supporting bracket, as shown most clearly in Figure 1, has a pair of upstanding side walls 41—41 at the opposite vertical edges thereof. The inner end of the lever K is pivoted between the side walls 41—41 by means of a pivot bolt 42 extending through said lever and the side walls. As most clearly shown in Figure 1, the inner end portion of the lever K is widened and has side flanges 43—43. The side flanges 43—43 are provided with interior inwardly projecting trunnions 44—44, which engage within the annular groove provided at the outer end of the sliding clutch member H. The lever K is normally held in the pendant position shown in Figures 1 and 2 by the action of gravity and thereby maintains the sliding clutch member H in clutching engagement with the gear B. In order to disengage the clutch member from the gear B, the lever K is pulled outwardly, thereby moving the sliding clutch member outwardly also and entirely disengaging the square section thereof from the gear B. The cylindrical bearing portions 17 and 20 of the clutch member are of such a length that they will not be completely disengaged from the drum and bearing boss 21 when the clutch member is moved outwardly to its limit. Outward movement of the clutch member is limited by engagement of the beveled inner end portion 45 of the lever with the outer face of the supporting bracket 40. In a chain tightening operation, the hand wheel D is rotated in a clockwise direction, as viewed in Figure 1, while the clutch member H is in clutching engagement with the gear B. As will be evident, rotation of the hand wheel will effect rotation of the gear C in a similar direction and rotation of the intermeshing gear B in a reverse or contra-clockwise direction. Inasmuch as the chain winding drum A is at this time clutched to the gear B, the chain winding drum will also be rotated in a contraclockwise direction, thus winding the chain thereon. During the chain winding operation, backward movement of the gear C and the hand wheel D is prevented by the locking dog F, which engages the ratchet E. Backward or unwinding rotation of the chain winding drum at this time is prevented through the clutching engagement thereof with the gear B. To quickly release the brakes, the clutch operating lever K is actuated by pulling the same outwardly, thereby disengaging the clutch from the gear B and permitting free running of the chain winding drum without rotation of the gears B and C and the operating hand wheel D. Inasmuch as the dog F at this time is operatively engaged with the ratchet member E, the hand weel D is positively locked against rotation in a chain unwinding direction, thus fully protecting the brakeman against injury at such time. After the brakes have been fully released and at a time when the chain winding drum comes to a rest, the clutch member H will be automatically re-engaged with the opening of the gear B by the action of gravity on the clutch operating lever K, as hereinbefore pointed out. In the event that the square opening in the hub of the gear B and the square section of the sliding clutch member are not in true alinement when the chain winding drum comes to rest upon full release of the brakes, a very slight rotation of the hand wheel D in chain winding direction will move the gear B to a sufficient extent to aline the opening thereof with the square section of the clutch member and permit the same to be re-engaged automatically. As will be evident, the operating lever K may also be manually actuated to re-engage the clutch member with the gear B.

When it is desired to ease off the brakes or back up the same, the clutch member H is left in engagement with the gear B and the locking dog F is disengaged from the ratchet member by operating the lever G in the proper direction. The hand wheel may then be operated in unwinding direction to permit unwinding of the chain from the drum.

Referring next to the embodiment of the invention illustrated in Figures 3 and 4, the brake mechanism proper is substantially the same as that hereinbefore described, but the clutch member and operating means therefor as well as the specific bearing supporting means for the chain winding drum and gear are modified. The parts of the improved hand brake mechanism, as illustrated in Figures 3 and 4, are enclosed within a housing similar to the housing hereinbefore described and comprising a rear section 111 in the form of a plate secured to the end wall 110 of the car, and a cover member 112 in most respects similar to the cover member 12. The brake mechanism includes an operating hand wheel, a ratchet member, a gear rotatable with the hand wheel, a locking dog cooperating with the ratchet member and an operating lever for the locking dog in all respects similar to the parts D, C, E, F and G, hereinbefore described. The gear connected to the hand wheel meshes with a gear B', which is of larger diameter and is connected to the chain winding drum A' by clutch means hereinafter more fully described. The gear B' is provided with a hub portion having an axial opening therethrough, which opening is of cylindrical cross section at the inner end of the hub, as indicated at 150, and is of square cross section at the outer end, as indicated at 151. The cylindrical portion 150 of the opening in the hub of the gear B' is rotatably supported on the inwardly extending bearing boss 152 provided on the rear wall of the housing. The outer side of the hub of the gear B' is provided with an exterior cylindrical bearing portion 153, which rotatably supports the inner end of the chain winding drum A'. The chain winding drum A' is provided with an axial opening 154 in alinement with the opening of the gear B'. The inner end portion of the opening 154 is of substantially square cross section, as indicated at 155, corresponding in size to the square portion of the opening in the hub of the gear B'. Outwardly of the square section 155, the opening 154 of the chain winding drum is enlarged, as shown, said enlarged portion being of circular form and fitting a projecting bearing boss 156 on the outer wall of the housing. The chain winding drum A' is otherwise in all respects similar to the drum A hereinbefore described and has the brake chain 122 fixed thereto. A sliding clutch member H' is supported within the hub of the chain winding drum A' and comprises cylindrical front and rear portions 157 and 158 and an intermediate section of square form 159. The section 159 is of such a size as to slidingly fit within the openings of both the chain winding drum A' and the gear B' so as to interlock these two members for rotation in unison during a chain tightening operation. The cylindrical portion 158 at the inner end of the sliding clutch member H' is rotatably supported within a bearing opening in the projecting boss 152 of the rear wall of the housing. The cylindrical section 157 of the clutch member extends through an opening 160 provided in the front wall of the housing and has the lever operated cam actuating means mounted thereon. Within the housing, the stem or cylindrical portion 157 of the clutch member H' is surrounded by a coil spring 161, which has its opposite ends bearing on the front wall of the housing and the forward face of the square section 159 of said sliding clutch member. As will be evident, the spring thus holds the clutch member yieldingly engaged within the square opening in the hub of the gear B'. The cam operating means for retracting the clutch member comprises a lever K' rotatably journaled on the outer projecting end of the sliding clutch member H', the lever being retained in operative position on said sliding clutch member by a locking nut 162 threaded on the outer end of said member. The inner end of the lever is provided with a cam head 163 comprising two similar helical faced cam portions, which cooperate with similar projecting cam members 164 on the outer side of the front wall of the housing.

The cooperating cam members 163 and 164 are so disposed that when the lever K' is rotated in a clockwise direction the sliding clutch member H' is pulled outwardly or to the left, as viewed in Figure 3, against the tension of the spring, and disengaged from the gear B', thereby permitting relative rotation between the chain winding drum and gear B' and free running of the drum to release the brakes. The operation of the improved hand brake mechanism, as illustrated in Figures 3 and 4 is substantially the same as that hereinbefore described, free running of the chain winding drum being permitted by disengagement of the clutch means of the gear B' while the hand wheel is held against rotation in an unwinding direction by means of a locking dog cooperating with the ratchet associated with the hand wheel.

We have herein shown and described what we now consider the preferred manner of carrying out our invention, but the same is merely illustrative and we contemplate all changes and modifications that come within the scope of the claims appended hereto.

We claim:

1. In a hand brake mechanism, the combination with a chain winding drum member; of a gear member coaxial therewith, said gear member and drum member having alined axial openings of angular cross section; a supporting bearing means; a clutch element slidably mounted in said drum opening, said clutch element having a portion of circular cross section rotatably supported on the bearing means, and a portion of angular cross section interfitting with said opening of one of said members, said portion of angular cross section being operatively engaged with the opening of the other member during a chain winding operation; and lever means for reciprocating said clutch element to disengage said angular portion from one of said members and permit free running of the chain during release of the brakes.

2. In a hand brake mechanism, the combination with rotary means for tightening the brakes, including a rotatable driven member; of a rotary driving member coaxial with the driven member, said members having alined axial openings of angular cross section; a bearing means coaxial with the openings of said members; a clutch element slidably mounted in the opening of one of said members, said clutch element having a portion of circular cross section rotatably supported in the bearing means, and a portion of angular cross section interfitting with said opening of one of said members, said portion of angular cross section being operatively engaged with the opening of the other member during a chain winding operation; spring means for normally holding said clutch element engaged with both members; and lever actuated cam means for moving said element to disengaged position.

3. In a hand brake mechanism, the combination with a housing; of a rotary chain winding drum; a rotary gear member, said drum and gear being rotatable about a common axis; means for actuating said gear member to rotate the same; a sliding clutch member for operatively connecting said drum and gear member for rotation in unison, said clutch member being slidably supported in said drum and gear member; a pair of bearing members on the housing for rotatably supporting said drum and gear, one of said bearing members extending into the hub of the gear and having an opening therein receiving one end of said clutch member; and lever means cooperating with the other end of said clutch member for actuating the same.

4. In a hand brake mechanism, the combination with a housing; of a rotary chain winding drum within the housing; bearing means within the housing rotatably supporting one end of said drum; a rotary driving gear, said gear and drum being coaxial; bearing means on the housing rotatably supporting said gear; cooperating interengaging rotary bearing means on said gear and drum;

a clutch member slidable within said drum and gear and axially thereof, said clutch member and drum being rotatable in unison, said clutch member having shouldered engagement with said gear to operatively connect the same thereto; and lever means pivoted to the housing for reciprocating said clutch to operatively engage the same with the gear and disengage the same therefrom, said clutch when disengaged permitting free rotation of the chain winding drum with respect to said driving gear.

5. In a hand brake mechanism, the combination with a housing; of a rotary chain winding drum within the housing; a rotary driving gear coaxial therewith, said drum and gear having alined axial openings of square cross section; bearing means on the housing for rotatably supporting said drum and gear; a clutch member slidably supported in said drum and movable axially thereof, said clutch member having a square section fitting the square openings of said drum and gear to interlock therewith and operatively connect said gear and drum for rotation in unison during application of the brakes; a spring for yieldingly holding said square section of the clutch engaged with the opening of said gear; and lever actuated cam means connected to said clutch for retracting the same against the action of said spring to disengage the drum and gear and permit free rotation of the drum with respect to the gear to release the brakes.

In witness that we claim the foregoing, we have hereunto subscribed our names this 5th day of August, 1930.

GEORGE A. JOHNSON.
STACY B. HASELTINE.